(12) United States Patent
Huang et al.

(10) Patent No.: US 11,290,184 B2
(45) Date of Patent: Mar. 29, 2022

(54) SWITCHABLE DISPERSION COMPENSATING MODULE

(71) Applicant: Molex, LLC, Lisle, IL (US)

(72) Inventors: Bichang Huang, Shenzhen (CN); Chao Shi, Saratoga, CA (US); Lifu Gong, San Jose, CA (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/289,700

(22) Filed: Mar. 1, 2019

(65) Prior Publication Data

US 2020/0280369 A1    Sep. 3, 2020

(51) Int. Cl.
*H04B 10/2513* (2013.01)
*G02B 6/293* (2006.01)
*H04B 10/2525* (2013.01)
*H04J 14/02* (2006.01)

(52) U.S. Cl.
CPC ... *H04B 10/25133* (2013.01); *G02B 6/29394* (2013.01); *H04B 10/25253* (2013.01); *H04J 14/0212* (2013.01); *H04B 2210/003* (2013.01)

(58) Field of Classification Search
CPC ........ H04B 10/25133; H04B 10/25253; H04B 2210/003; G02B 6/29394; H04J 14/0212
See application file for complete search history.

(56) References Cited

U.S. PATENT DOCUMENTS

| | | | | |
|---|---|---|---|---|
| 5,608,562 A | * | 3/1997 | Delavaux | G02B 6/29376 398/148 |
| 5,717,510 A | * | 2/1998 | Ishikawa | H04B 10/0795 398/147 |
| 6,229,631 B1 | * | 5/2001 | Sato | H04B 10/0775 398/30 |
| 6,307,988 B1 | | 10/2001 | Eggleton et al. | |
| 6,320,687 B1 | * | 11/2001 | Ishikawa | H04B 10/2519 398/147 |
| 6,765,659 B1 | | 7/2004 | Bhatnagar et al. | |
| 6,798,500 B2 | | 9/2004 | Wilson et al. | |
| 6,871,024 B2 | * | 3/2005 | Nishimoto | H04B 10/25133 398/147 |
| 7,016,023 B2 | | 3/2006 | Peerlings | |

(Continued)

FOREIGN PATENT DOCUMENTS

CN    102075241 B    1/2014
EP    1385281 B1    12/2009
(Continued)

*Primary Examiner* — Mina M Shalaby

(57) ABSTRACT

An optical fiber transmission system and method for using the system are provided. The system may include a span of transmission fiber for transmitting light signals through the optical fiber transmission system. The system may include a dispersion compensating module coupled to the span of transmission fiber. The system may include a switchable module including a set of selectable light signal paths, the set of selectable light signal paths including at least one path through a dispersion compensating element. The system may include a processor coupled to the switchable module for selectively monitoring the set of selectable light signal paths, where the processor is further configured to derive a metric based on the set of selectable light signal paths for controlling the dispersion compensating module.

10 Claims, 9 Drawing Sheets

(56) References Cited

U.S. PATENT DOCUMENTS

| | | | |
|---|---|---|---|
| 7,616,893 B2* | 11/2009 | Ooi | H04J 14/0201 398/147 |
| 7,653,310 B2* | 1/2010 | Sekine | H04B 10/25133 385/11 |
| 7,693,365 B2 | 4/2010 | Kauffman | |
| 7,787,775 B2 | 8/2010 | Boduch et al. | |
| 8,014,668 B2 | 9/2011 | Wan et al. | |
| 8,081,877 B2 | 12/2011 | Duan et al. | |
| 8,412,045 B2 | 4/2013 | Murakami et al. | |
| 8,611,764 B2 | 12/2013 | Ota | |
| 8,930,430 B2 | 1/2015 | Stojanovic | |
| 10,122,460 B2* | 11/2018 | Alfiad | H04B 10/2513 |
| 10,225,016 B1* | 3/2019 | Khaleghi | H04B 10/25133 |
| 2005/0226613 A1* | 10/2005 | Raddatz | H04B 10/25133 398/27 |
| 2005/0226629 A1* | 10/2005 | Ooi | H04B 10/25133 398/147 |
| 2008/0056726 A1* | 3/2008 | Sugiya | H04B 10/25133 398/147 |
| 2008/0151377 A1* | 6/2008 | Sekine | G02B 6/29394 359/615 |
| 2008/0279563 A1* | 11/2008 | Shu | H04B 10/2513 398/147 |
| 2008/0279565 A1* | 11/2008 | Shu | H04B 10/25133 398/158 |
| 2009/0060523 A1* | 3/2009 | Qiao | H04B 10/07951 398/147 |
| 2009/0067783 A1* | 3/2009 | Webb | H04B 10/25133 385/27 |
| 2009/0080901 A1* | 3/2009 | Miura | G02B 6/29358 398/158 |
| 2009/0202248 A1* | 8/2009 | Zhang | H04B 10/07951 398/81 |
| 2009/0238571 A1* | 9/2009 | Nakamura | H04B 10/07951 398/97 |
| 2009/0310975 A1* | 12/2009 | Shu | H04B 10/2513 398/147 |
| 2010/0329695 A1* | 12/2010 | Sridhar | H04B 10/25253 398/159 |
| 2011/0058820 A1* | 3/2011 | Ooi | H04B 10/2513 398/147 |
| 2011/0176805 A1* | 7/2011 | Mahlab | H04B 10/25133 398/48 |
| 2011/0222864 A1* | 9/2011 | Vassilieva | H04B 10/2513 398/158 |
| 2012/0039616 A1* | 2/2012 | Striegler | H04B 10/0773 398/149 |
| 2013/0045004 A1 | 2/2013 | Geyer | |
| 2014/0079111 A1* | 3/2014 | Hui | H04L 25/03044 375/234 |
| 2018/0205461 A1* | 7/2018 | Alfiad | H04J 14/02 |
| 2019/0349092 A1* | 11/2019 | Qiao | H04B 10/2513 |

FOREIGN PATENT DOCUMENTS

| | | |
|---|---|---|
| EP | 2372332 B1 | 9/2017 |
| WO | 2007146628 A2 | 12/2007 |

* cited by examiner

SWITCHABLE DISPERSION COMPENSATING MODULE

BACKGROUND

Field

The present disclosure relates to the field of fiber optic transmission systems, and more particularly, but not exclusively, to the fiber optic transmission systems that employ dispersion compensation.

Background

Communication systems may rely on fiber optics as a transmission medium. Single mode optical fibers may have positive dispersion (e.g., positive chromatic dispersion) in signals that are transmitted through wavelengths of light. When the signals propagate through media such as optical fibers, the waveform of the signal may deteriorate due to cumulative dispersion. In view of this, dispersion compensating fiber or a dispersion compensating module may be used as a constituent element of an optical communications system in order to compensate for the waveform deterioration of the signal light caused by the dispersion. In some fiber optic transmission systems that may include high speed modulation or long spans of optical fiber, the dispersion compensating fiber or dispersion compensating module, however, may not cancel out all dispersion which may give rise to residual dispersion of the transmission system.

Accordingly, with increasing demands for transmission speeds and longer distance fiber optic transmission lines there is a need for improved dispersion compensation systems and methods using fiber optic media.

SUMMARY

In an aspect of the disclosure, an optical fiber transmission system is provided. The system may include a span of transmission fiber for transmitting light signals through the optical fiber transmission system. The system may include a dispersion compensating module coupled to the span of transmission fiber. The system may include a switchable module including a set of selectable light signal paths, the set of selectable light signal paths including at least one path through a dispersion compensating element. The system may include a processor coupled to the switchable module for selectively monitoring the set of selectable light signal paths, where the processor is further configured to derive a metric based on the set of selectable light signal paths for controlling the dispersion compensating module.

In another aspect of the disclosure, an optical transmission system is provided. The system may include a light transmission means for transmitting light signals through the optical transmission system. The system may include a dispersion compensating means coupled to the light transmission means. The system may include a switchable means including a set of selectable light signal paths, the set of selectable light signal paths including at least one path through a second dispersion compensating means. The system may include a processing means coupled to the switchable means for selectively monitoring the set of selectable light signal paths, wherein the processing means is further configured to derive a metric based on the set of selectable light signal paths for controlling the dispersion compensating means.

In another aspect of the disclosure, a method for dispersion compensation in an optical fiber transmission system is provided. The method may include determining a set of error metrics by selectively reading a set of signals from a switchable module. The method may include calculating a metric for dispersion compensation based on the set of error metrics. The method may include controlling a dispersion compensating module to offset dispersion in a span of transmission fiber based on the metric for dispersion compensation.

DETAILED DESCRIPTION

Figure 1:
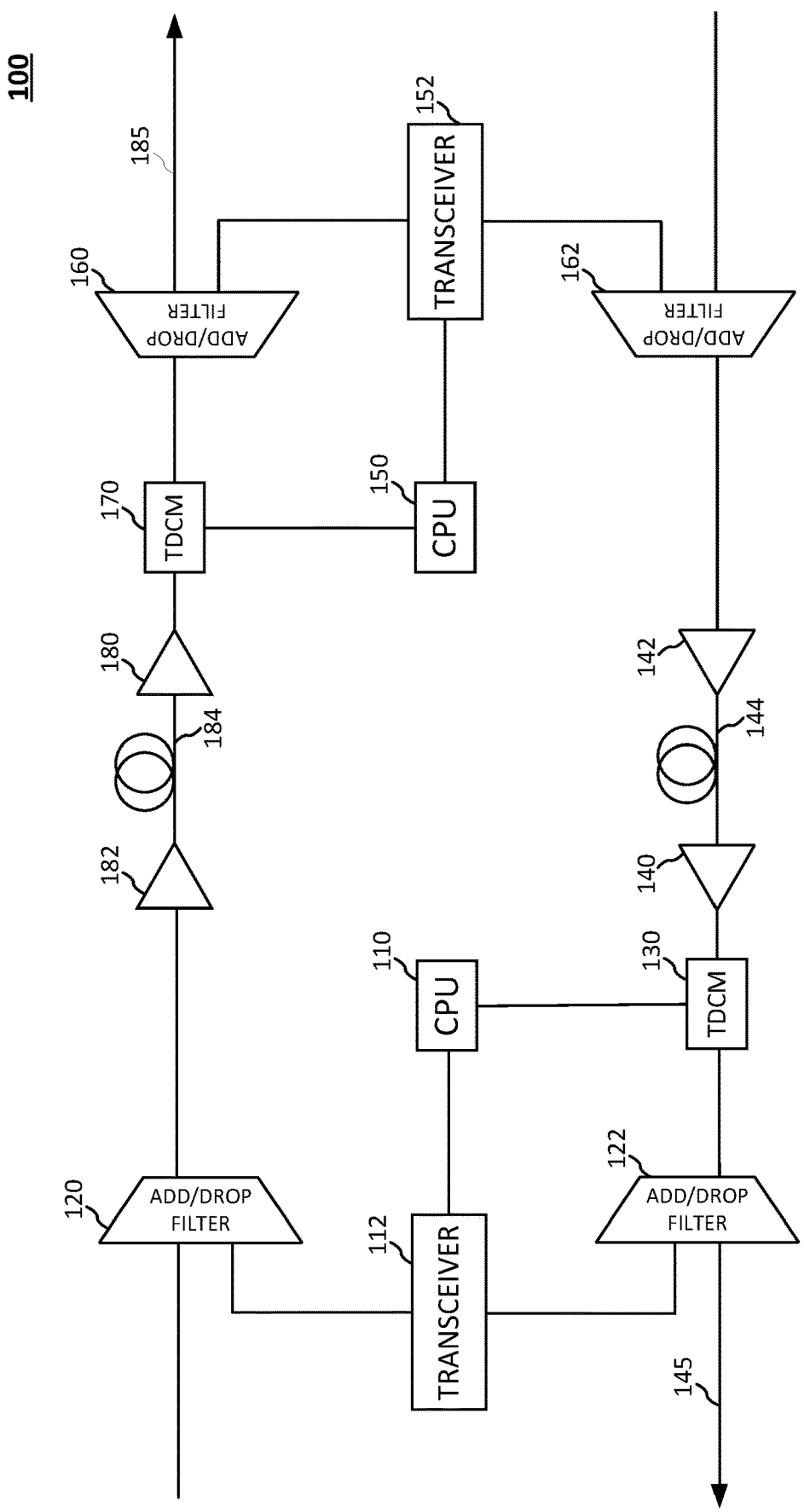
FIG. 1 is a diagram illustrating an exemplary optical fiber transmission system including tunable dispersion compensating modules (TDCMs), in accordance with one or more aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will, however, be apparent to those skilled in the art that these concepts may be practiced without these specific details. In some instances, well known structures and components are shown in block diagram form in order to avoid obscuring such concepts.

Disclosed herein are systems and methods for fiber transmission systems including switchable dispersion compensating modules.

Fiber transmission systems may include runs of fiber. Dispersion may be an inherent aspect of light transmission through fiber optics. Dispersion may include light or the wave front varying with the frequency of light. Over a distance, the light signal may exhibit dispersion phenomena. In the context of data, dispersion may cause a symbol or signal to become sufficiently broadened that one signal overlaps with neighboring signals. Signal transmission errors may occur in such instances.

A dispersion-compensating optical fiber may be an optical device which compensates for dispersion (e.g., chromatic dispersion) in the optical transmission line in which the dispersion-compensating module is inserted. Since single mode optical fibers used as the optical transmission line may have a positive wavelength dispersion slope (also referred to as positive dispersion), optical fibers having a negative wavelength dispersion slope (also referred to as negative dispersion) may be employable as the dispersion-compensating optical fiber. Further a loss equalizer or amplifier (e.g., an erbium-doped fiber amplifier) may compensate for losses from the dispersion-compensating optical fiber. Time varying or environmental factors (like temperature) may contribute residual dispersion that is not accounted for. The disclosure herein provides for systems and methods for counteracting the residual dispersion that may be present in high speed or long span fiber optic transmission systems.

In some embodiments, dispersion may be offset using a dispersion-compensating module including tunable dispersion compensating modules (TDCM). The terms TDCM and tunable dispersion compensator may be used interchangeably in the disclosure. The various mechanisms for dispersion compensation (e.g., dispersion compensating fiber, TDCM, etc.) may be referred to as dispersion compensators. Control of the TDCMs may be based on feedback mechanism. For example, bit error rates arising from signal dispersion may be continuously monitored to offset the dispersion.

Several aspects of the fiber transmission system will now be presented with reference to various apparatuses and methods. These apparatuses and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

FIG. 1 is a diagram illustrating an example optical fiber transmission system including TDCMs. The system 100 may include two nodes represented by the CPUs 110, 150 of a fiber transmission system. The system may include a length of dispersion-compensating fiber DCF 144. For example, the DCF 144 may include a run of optical fiber for signal transmission coupled to one or more dispersion-compensating modules. The system 100 may include amplifiers 140, 142 to offset signal losses. For example, the DCF 144 may cause signal losses, e.g., due to the DCM or other factors such as signal attenuation from long runs of optical fiber.

A first node in the system 100 may include a processor CPU 110 coupled to a transceiver 112 for transmitting and receiving optical signals. CPU 110 may include memory/storage or the memory/storage may be discrete components (not shown). The CPU 110 may be coupled to and control the tunable dispersion compensating module TDCM 130. TDCM 130 may be used to compensate for dispersion not accounted for by the dispersion-compensating fiber 144. The CPU 110's control of the TDCM 130 may be based on static control or a feedback mechanism using signals from the transceiver 112. Transceiver 112 may be coupled to optical add-drop multiplexer (OADM) 120, 122. The OADM may be referred to as an optical add-drop filter (OADF). The OADMs 120, 122 may multiplex and route channels of light into or out of the optical fibers. In the example of FIG. 1 the signal from TDCM 130 may be to multiplexed to the transceiver 112 and to the run of fiber 145.

In some instances, residual dispersion may exist after the DCF 144 and TDCM 130. Residual dispersion may be present due to various factors such as environmental conditions including ambient temperature, etc. In some cases, the transmission system may monitor bit error rates resulting from dispersion to adjust for residual dispersion. The CPU 110 may monitor signals from transmission line 144 and determine a dispersion compensation value for adjusting residual dispersion. The CPU 110 may send a signal including the value for adjusting residual dispersion to the TDCM 130.

A second node in the system 100 may include processor CPU 150. Similar elements in the second node may correspond to similar elements in the first node and may share similar functions.

The second node in the system 100 may include the processor CPU 150 coupled to a transceiver 152 for transmitting and receiving optical signals. CPU 150 may include memory and storage or the memory and storage may be discrete components (not shown). The CPU 150 may be coupled to and control the TDCM 170. TDCM 170 may be used to compensate for dispersion (e.g., residual dispersion) not accounted for by the dispersion-compensating fiber 184. The CPU 150's control of the TDCM 170 may be based on static control or a feedback mechanism using signals from the transceiver 152. Transceiver 152 may be coupled to OADM 160, 162. The OADMs 160, 162 may multiplex and route channels of light into or out of the optical fibers. In the example of FIG. 1 the signal from TDCM 170 may be multiplexed to the transceiver 152 and to the run of fiber 185.

The system 100 may include amplifiers 180, 182 to offset signal losses.

In some instances, residual dispersion may exist after the DCF 184 and TDCM 170. Residual dispersion may be present due to various factors such as environmental conditions including ambient temperature, etc. In some cases, the transmission system may monitor bit error rates resulting from dispersion to adjust for residual dispersion. The CPU 150 may monitor signals from transmission line 184 and determine a dispersion compensation value for adjusting residual dispersion. The CPU 150 may send a signal including the value for adjusting residual dispersion to the TDCM 170.

Figure 2:
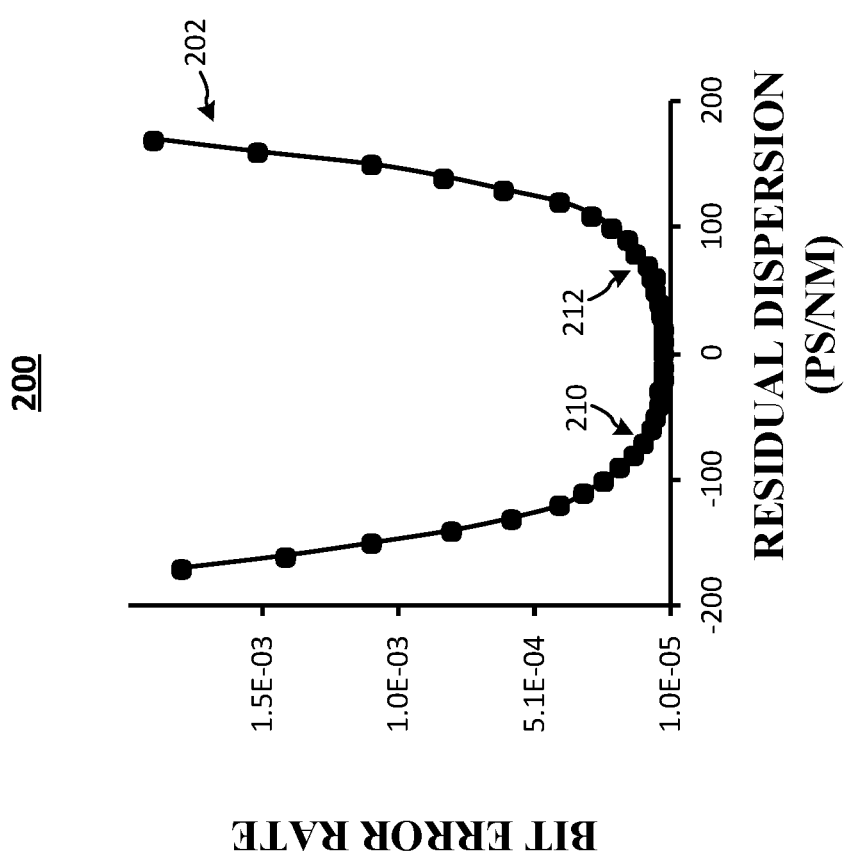
FIG. 2 is an exemplary chart illustrating a relationship between residual dispersion and the bit error rate (BER) for a fiber transmission system, in accordance with one or more aspects of the disclosure.

FIG. 2 is an example chart illustrating a relationship between residual dispersion and a bit error rate (BER) for a fiber transmission system. For example, the chart 200 in FIG. 2 may illustrate the relationship of components in the transmission system 100 of FIG. 1.

The curve 202 in FIG. 2 may illustrate the relationship. In long span (or length) fiber lines, the residual dispersion may sometimes be large. Although the illustrations and methods may typically include long spans, any length of optical fiber lines may exhibit residual dispersion that is suitably offset using the systems and methods disclosure herein. Residual dispersion in the fiber causes errors that may be calculated as a BER, as the magnitude of the residual dispersion increases the BER rises rapidly. The curve 202 shows the parabolic shape with BER having a large change with larger magnitudes of residual dispersion. At the center of the chart 200, the BER may be small; at the edges, the BER may be relatively large. In the approximate center area between around points 210 and 212, the BER may include only modest change in value with changes in residual dispersion. In such instances, it may be difficult to determine the residual dispersion based on the BER because the BER exhibits only minor changes in magnitude with an increase in residual dispersion. An alternative method may be desirable that can discriminate residual dispersion around the center of the curve with zero dispersion.

The transmission system may be a 50 gigabit per second (Gbps) pulse amplitude modulation with four amplitude levels (PAM-4) transmission system showing the relative flat curve area between plus-minus 60 picoseconds per nanometer (ps/nm). For a single lambda 100 Gbps PAM4 system, the relative flat curve area may be between plus-minus 15 ps/nm compared to the 60 ps/nm.

Because processors/controllers may read the BER as an input for determining adjustments for dispersion (e.g., the residual dispersion), when the BER changes only slightly due to large differences in the dispersion, it may be difficult to use the BER relationship illustrated in FIG. 2. This may suggest that BER is not reliable for adjusting dispersion (e.g., at a TDCM). Thus, it may be difficult to perform fine adjustments when the residual dispersion is in the area between points 210, 212. It may be desirable to create a linear relationship between BERs and residual dispersion so that fine adjustments may be made. Such a linear relationship is described below with reference to FIGS. 3A-B.

Figure 3B:
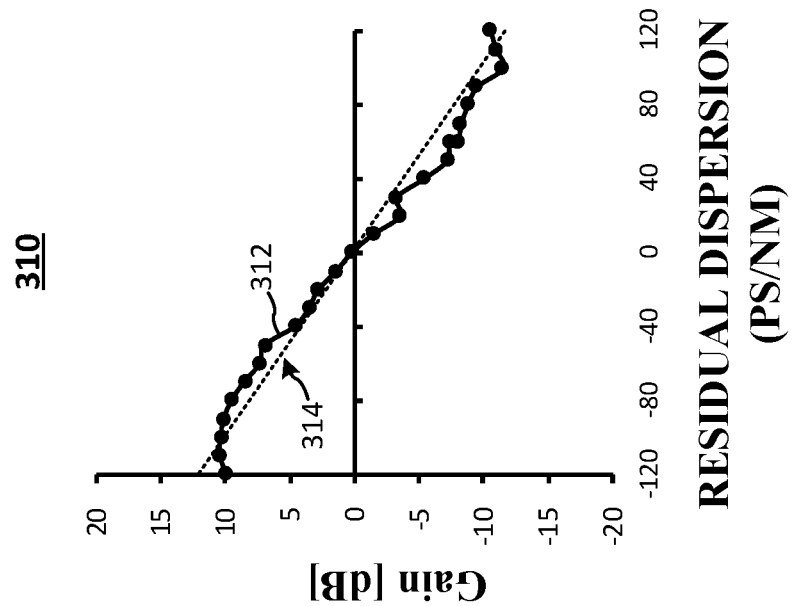
FIGS. 3A-B are exemplary charts illustrating a relationship between residual dispersion and bit error rate for fiber transmission systems, and a relationship between the gain in decibels (dB) and residual dispersion based on a function of the curves from FIG. 3A, in accordance with one or more aspects of the disclosure.
Figure 3A:
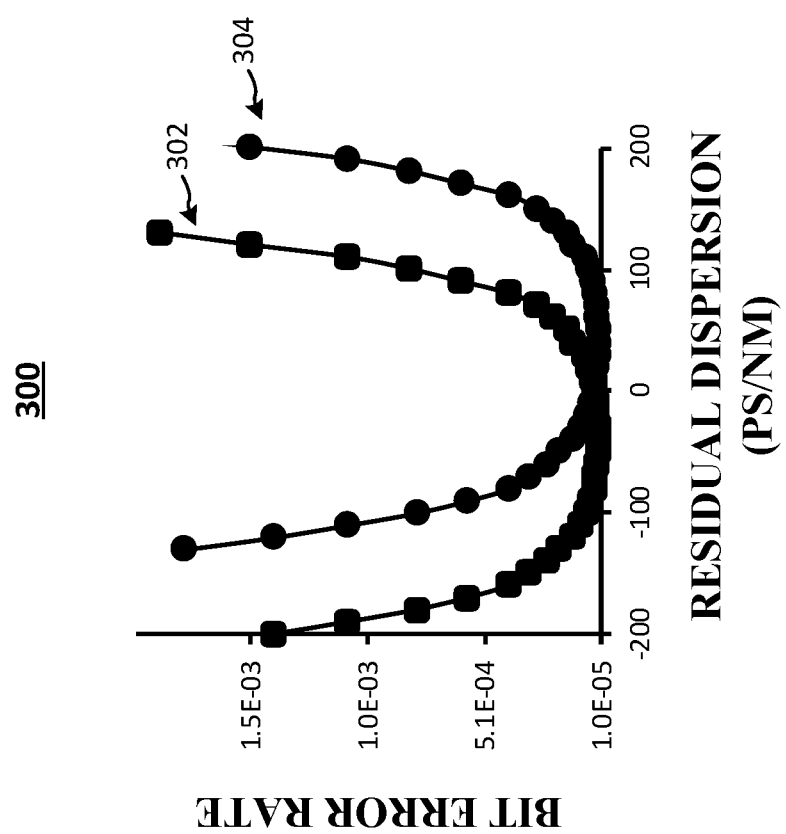

FIG. 3A is an example chart illustrating relationships between residual dispersion and bit error rate for fiber transmission systems. The chart may be based on a module such as module 400 of FIG. 4A, with each DCM 412, 414 generating the data for the curves.

In chart 300 the curves 302 (square data points), 304 (circle data points) may represent two relationships for BERs with the curve centers offset by a given dispersion quantity. Curve 302 may be offset by −40 ps/nm; curve 304 may be offset by +40 ps/nm. Each of the curves 302, 304 may have similar characteristics such as a parabolic shape to the chart in FIG. 2.

FIG. 3B is another example chart illustrating the relationship between the gain in decibel (dB) and residual dispersion based on a function of the curves from FIG. 3A. Using the two BER curves 302, 304, a new relationship 312 may be derived that shows an approximately linear line 312. Based on the datapoints of the curve 312, a best fit linear curve or trendline 314 may be estimated, e.g., using regression analysis, computer software, interpolation models and formula or other methods that are obvious to one skilled in the art. In the example, the trendline may be approximated by the equation: Gain=−0.1*RD−0.012, where RD is the residual dispersion. Alternatively, residual dispersion (RD) may be solved based on the Gain: Residual Dispersion=−10*Gain−1.2. In some embodiments a method may determine the gain and calculate the residual dispersion to modifying a dispersion compensator.

The function for an error metric expressed in decibels (dB) may be represented by Equation 1 below:

$$\text{Error}=f(b1,b2)=10*\log(b1)-10*\log(b2); \quad \text{(Equation 1)},$$

where b1 may be BER 1, b2 may be BER 2.

The curve 312 shows that the relationship between gain and residual dispersion is approximately linear, including near zero residual dispersion. Based on the approximately linear curve 312 and trendline 314, monitoring and fine adjustments of residual dispersion may be practically performed. For example, if the Error increases by 5 dB, the system may control a TDCM to shift dispersion by 40 ps/nm to return residual dispersion to approximately zero. Vice versa, if the Error decreases by 5 dB, the system may control the TDCM to shift dispersion by minus 40 ps/nm to return residual dispersion to approximately zero.

Figure 4B:
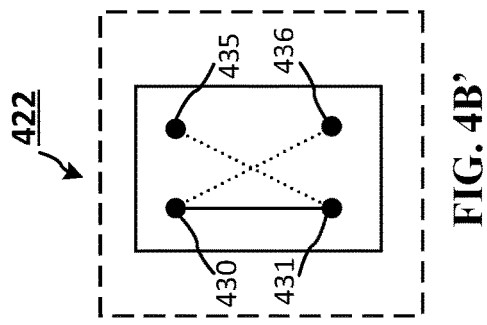
FIGS. 4A-D are diagrams illustrating exemplary switchable DCM (S-DCM) embodiments, including two DCMs (FIG. 4A), a DCM and a pass-through segment (FIG. 4B), a perspective view of the S-DCM switch of FIG. 4B (FIG. 4B'), a switchable DCM including n-number of DCM components (FIG. 4C), a perspective view of the S-DCM switches of FIG. 4C (FIG. 4C'), and a generalized S-DCM circuit diagram (FIG. 4D), in accordance with one or more aspects of the disclosure.
Figure 4B:
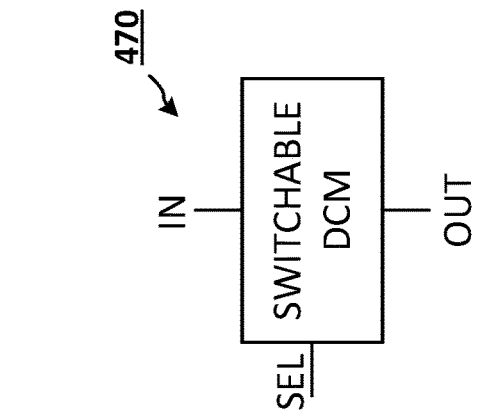
Figure 4B:
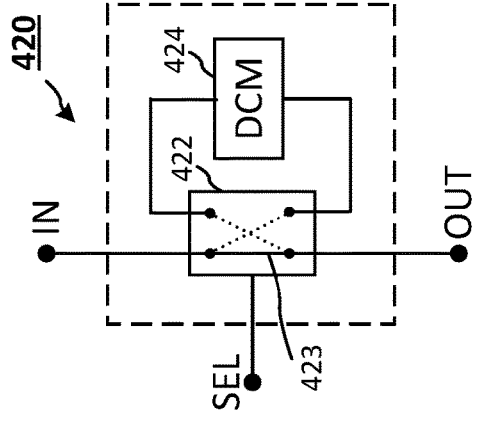
Figure 4D:
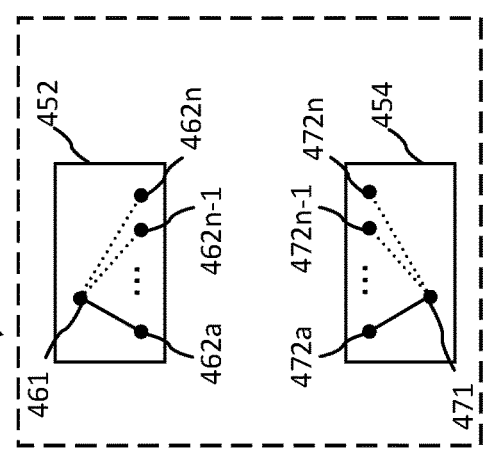

FIGS. 4A-D are diagrams illustrating exemplary switchable DCM (S-DCM) embodiments, including two DCMs (FIG. 4A), a DCM and a pass-through segment (FIG. 4B), a switchable DCM including n-number of DCM components (FIG. 4C), and a generalized S-DCM circuit diagram (FIG. 4D).

Figure 4A:
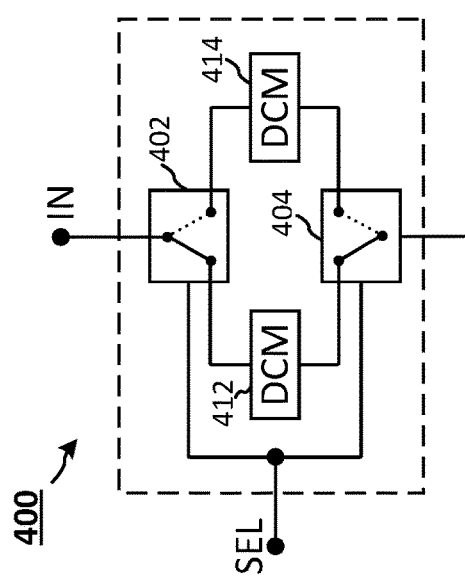

FIG. 4A is a diagram illustrating an exemplary switchable DCM 400 including two DCMs. The DCMs may be referred to a "internal" DCMs, "inner" DCMs, or dispersion compensating elements. The S-DCM 400 may be the component creating the curves of FIG. 3A with each DCM producing each of the curves 302, 304. The switchable DCM may include three connections including the input (IN), output (OUT), and a selector control line (SEL). The input (IN) and output (OUT) may be signal lines (e.g., for light signals). The selector control line may be coupled to the two switch circuits 402, 404 for selecting DCMs placed in parallel within the S-DCM. In the example S-DCM 400, the two switch circuits 402, 404 may select between DCM 412 and DCM 416. The switch component may be an optical switch circuit. When the switches are in the first position, DCM 412 may be selected to modify the signal for output based on DCM 412. When the switches are the second position (illustrated as dotted lines in FIG. 4A), DCM 414 is selected to modify the signal for output based on DCM 414.

FIG. 4B is a diagram illustrating another example switchable DCM 420. The S-DCM 420 may include three connections including the input (IN), output (OUT), and a selector control line (SEL). The selector control line may be coupled to the switch circuit 422 for selecting the pass-through path 423 (e.g., uncompensated segment 423) or the path through the DCM 424. When the switch is in the first position, the pass-through option 423 is selected, the input signal is uncompensated for output. When the switch 422 is in the second position, the DCM 424 is selected to modify the signal based on the DCM 424. The DCM 424 may be any suitable DCM for the type of input signal.

FIG. 4B' is a perspective view of the switch 422 used in FIG. 4B. Components, elements, and connections other than the switch 422 are omitted for simplicity. The switch 422 may be an optical switch including four (4) points of connection or nodes 430, 431, 435, 436. Node 430 may be an entry node; node 431 may be an exit node. When the switch 422 is in the first position (e.g., described above in FIG. 4B as the pass-through path), the entry node 430 may be directly coupled to the exit node 431 without passing through a path including dispersion compensation. When the switch 422 is in the second position (e.g., described above in FIG. 4B as the path including DCM 424), the entry node 430 may be coupled to node 436, the exit node may be coupled to node 435. Nodes 435 and 436 may be coupled to DCM 424 as illustrated in FIG. 4B.

Figure 4C:
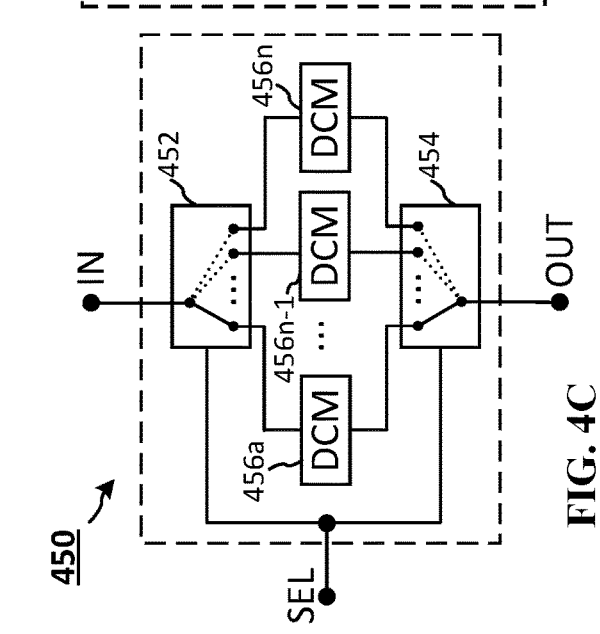

FIG. 4C is a diagram illustrating another exemplary switchable DCM 450 including n-number of DCMs. The switchable DCM 450 may include three connections including the input (IN), output (OUT), and a selector control line (SEL). The selector control line may be coupled to two switch circuits 452, 454 each having a 1-to-n circuit for selecting one of the n-number of DCMs 456a, . . . , 456n−1, 456n. The switch components may be optical switch circuits. When the switches 452, 454 are in the first position (as illustrated in FIG. 4C), DCM 456a is selected to modify the signal for output based on DCM 456a. When the switches are a second or subsequent position, one of DCMs . . . , 456n−1, 456n is selected to modify the signal for output. One or more of the DCMs 534a, . . . , 534n−1, 534n may be a pass-through module. In some embodiments the selector (SEL) line may be a control line for connection to a CPU. The CPU may control the switches 452, 454 via the SEL line. The DCMs may be selected in any number of ways including based on the dispersion characteristics of the input fiber or output fiber, distance, ambient or working temperature, humidity, etc. While the elements 456a . . . 456n are illustrated as DCMs, any suitable components that may fit the design goals or needs may be used in place of the DCMs. For example, pass-through segments without dispersion compensation may be used in place of any one of DCMs 456a . . . 456n.

FIG. 4C' is a perspective view 460 of the switches 452, 454 used in FIG. 4C. Components, elements, and connections other than the switches 452, 454 are omitted for simplicity. The switch 452 may be an optical switch including n+1 points of connection or nodes 461, 462a . . . 432n. Node 461 may be an entry node for the S-DCM 450 (node 461 may also be an entry node for the switch 452). Nodes 462a . . . 462n may by n nodes for coupling to one of DCMs 456a . . . 456n of FIG. 4C, with a corresponding one of the nodes 462a . . . 462n coupling to a corresponding one of the DCMs 456a . . . 456n of FIG. 4C.

The switch 454 may be an optical switch including n+1 points of connection or nodes 461, 462a . . . 432n. Node 471 may be an exit node for the S-DCM 450 (node 471 may also be an exit node for the switch 454). Nodes 472a . . . 472n may by n nodes for coupling to one of DCMs 456a . . . 456n of FIG. 4C, with a corresponding one of the nodes 462a . . . 462n coupling to a corresponding one of the DCMs 456a . . . 456n of FIG. 4C.

When a first position (e.g., to select DCM 456a) of the S-DCM 450 of FIG. 4C is selected via the SEL line, the switches 452, 454 may configure their nodes to couple to DCM 456a. For example, the entry node 461 may couple to node 462a; exit node 471 may couple to node 472a. Nodes 462a and 472a may couple to DCM 456a, at the entry and exit of DCM 456a, respectively.

As another example, when the n−1 position of the S-DCM 450 is selected (e.g., to select DCM 456n−1), the switches 452, 454 may configure their nodes to couple to DCM 456n−1. For example, the entry node 461 may couple to node 462n−1; exit node 471 may couple to node 472n−1. Nodes 462n−1 and 472n−1 may couple to DCM 456n−1, at the entry and exit of DCM 456a, respectively.

In this manner, for a corresponding position selection of the S-DCM 450 (e.g., to select one of the DCMs 456a . . . 456n), the switches configure their node connections to couple to the corresponding DCM 456a . . . 456n.

FIG. 4D is a diagram illustrating a generalized S-DCM 470 circuit diagram encapsulating the components of, for example, S-DCMs 400, 420, 450, etc. The switchable DCM 470 may include three connections including the input (IN), output (OUT), and a selector control line (SEL). N-number of DCMs, each DCM from 1 to n may be specified. The DCMs may be referred to as "internal" DCMs, "inner" DCMs, or dispersion compensating elements. In some embodiments, the DCMs may be configured for specific system configurations, modulations, data rates, etc.

Figure 5:
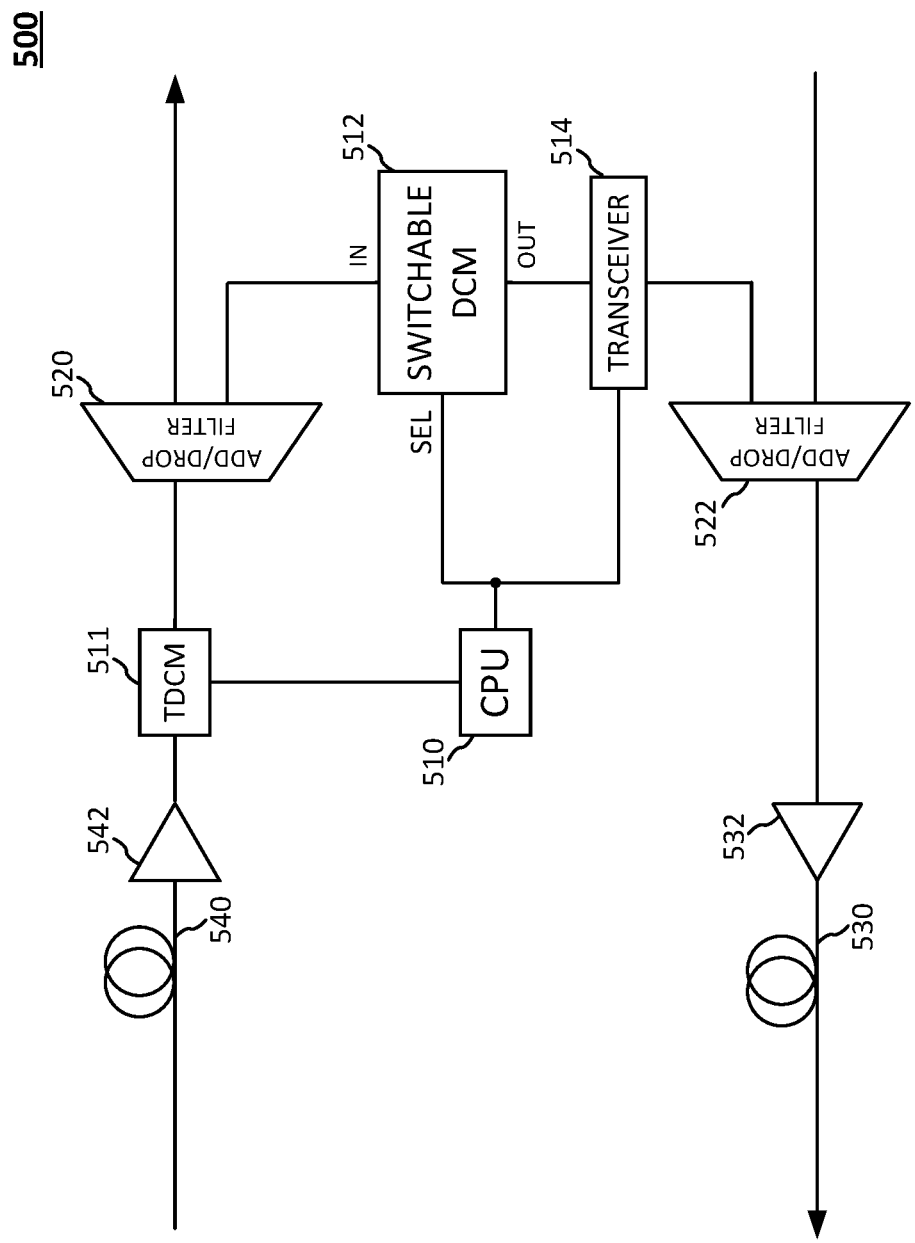
FIG. 5 is a diagram illustrating another exemplary optical fiber transmission system including a switchable DCM. System 500 may represent a node of a fiber transmission system, in accordance with one or more aspects of the disclosure.

FIG. 5 is a diagram illustrating another exemplary optical fiber transmission system 500 including a switchable DCM 512. System 500 may represent a node of a fiber transmission system. The system 500 may include a long run length of dispersion compensating fiber lines 540, 530 including amplifiers 542, 532 on the respective lines to offset losses in the signals (e.g., due to dispersion compensating modules, etc.). The node may include a processor CPU 510 coupled to a TDCM 511, switchable DCM 512, and a transceiver 514. The CPU 510 may control the S-DCM 512 for feedback to control dispersion (e.g., residual dispersion) of the fiber transmission system 500. OADF 520, 522 may enable transmission signals to be multiplexed to and from the transceiver 514.

In one embodiment, the S-DCM 512 may be a switched DCM with dual inner DCMs as illustrated in FIG. 4A. Transceiver 514 may be configured to provide a reading or status of the signal based on the S-DCM 512. For example, the CPU 510 may determine a BER based on signals received at the transceiver 514. The CPU 510 may control the S-DCM 512 to continuously switch between the inner DCMs to gather the BERs of each inner DCM. Based on the BER values, the CPU 510 may calculate an adjustment for the residual dispersion in the signal. After the CPU 510 determines the adjustment, the CPU 510 may control the TDCM 511 to offset the dispersion. In some embodiments, the CPU 510 may control the S-DCM 512 and transceiver 514 in a continuous feedback loop to continuously monitor and adjust dispersion. In some embodiments, the CPU 510 may control the TDCM 511 and S-DCM 512 at specific times or intervals (e.g., based on user preference and input).

The logic used by CPU 510 may be based on Equation 1 provided above that is a function of the BERs of the two inner DCMs. For example, the CPU 510 may control the S-DCM 512 to switch between the inner DCMs to determine the BER of each inner DCM. Because each inner DCM may have a different dispersion offset, the CPU may read a different BER as the transceiver decodes the signals. The S-DCM 512 may begin by switching to one of the inner DCMs for the signal to propagate to the transceiver 514. The CPU 510 may detect a BER of the one inner DCM based on signals received at the transceiver 514. The CPU 510 may temporarily store the first BER. Next the CPU 510 may control the S-DCM 512 to switch to the second inner DCM for the signal to propagate to the transceiver 514. The CPU 510 may detect a second BER of the second inner DCM based on signals received at the transceiver 514. With the detection of the two BERs, the CPU 510 may derive a metric for correcting the residual dispersion in the fiber line 540. For example, the CPU 510 may calculate the logarithmic functions, namely the metric or error that may be defined by, e.g., the function of Equation 1, $10*\log(b1)-10*\log(b2)$. The residual dispersion is approximately a linear function of the metric, and the CPU 510 may control the TDCM 511 using the residual dispersion correction to return the dispersion closer to zero dispersion. At approximately zero dispersion, the BER may be approximately zero. Next the CPU 510 may control the S-DCM 512 to switch back to the first inner DCM to repeat the process. In some embodiments, the CPU 510 may control the S-DCM 512 and TDCM 511 at specified times or time intervals.

In some embodiments, the S-DCM 512 may be the S-DCM 420 of FIG. 4B or S-DCM 450 FIG. 4C. In such instances the logic may be adjusted based on the S-DCM implementation. The switched DCM is a versatile component, and one skilled in the art will recognize that other embodiments may be substituted based on system design.

Figure 6A:
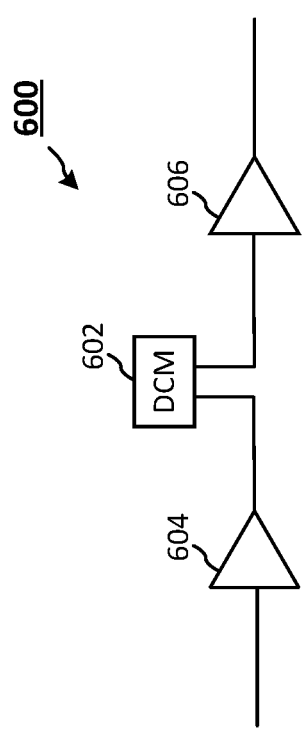
FIGS. 6A-B are diagrams illustrating exemplary optical transmission lines including a DCM inserted into a run of optical fiber and an S-DCM inserted into a run of optical fiber, in accordance with one or more aspects of the disclosure.

FIG. 6A is a diagram illustrating an exemplary optical transmission line configuration 600 including a DCM 602 inserted into a run of optical fiber. The DCM 602 may be inserted into a run of optical fiber between amplifiers 604, 606. The amplifiers 604, 606 may be used to offset losses from the DCM or other components in the transmission system. The DCM 602 may offset a fixed amount of dispersion.

Figure 6B:
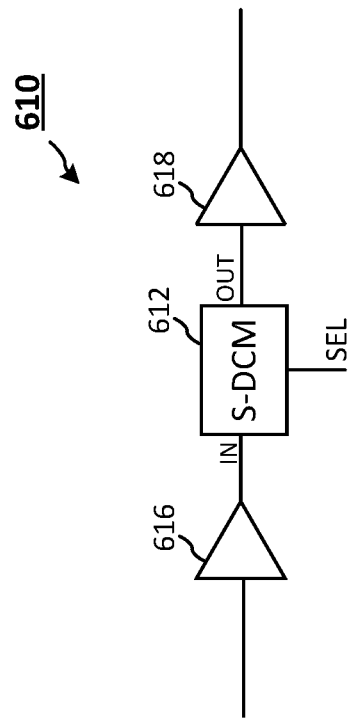

FIG. 6B is a diagram illustrating an exemplary optical transmission line configuration 610 including switched DCM 612 inserted into a run of optical fiber. The S-DCM 612 provides flexible dispersion compensation in some embodiments where a DCM may not provide sufficient dispersion compensation. The switched DCM 612 allows for at least two options for dispersion compensation thereby increasing the potential amount of dispersion compensation. In some embodiments, the S-DCM 612 may be implemented using module 420 of FIG. 4B including a pass-through option. The S-DCM 612 may be controlled by a processor (not shown) coupled to the SEL control line. The amplifiers 616, 618 may be used to offset losses from the S-DCM 612 or other components in the transmission system.

Figure 7:
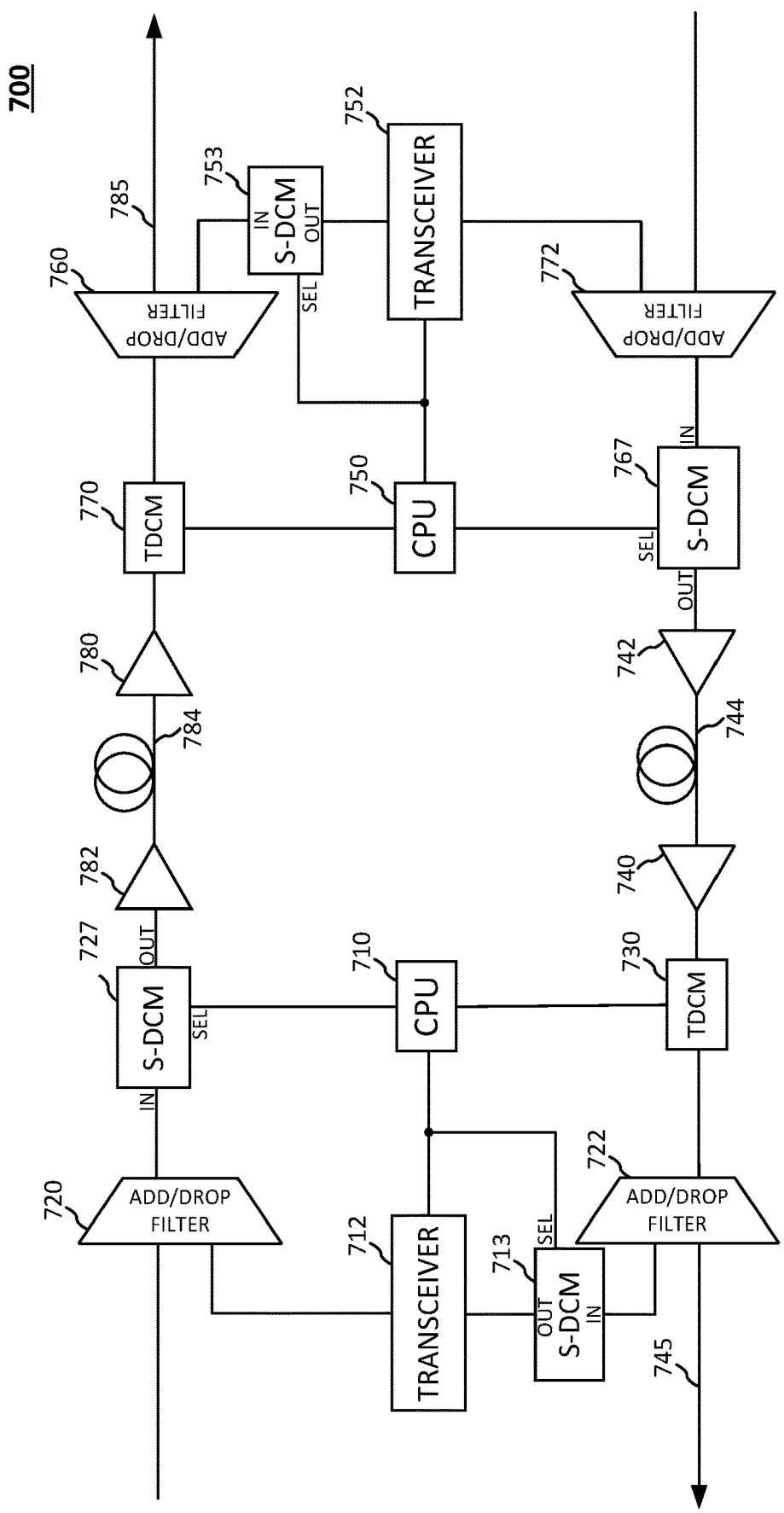
FIG. 7 is a diagram illustrating an example optical fiber transmission system including S-DCMs, in accordance with one or more aspects of the disclosure.

FIG. 7 is a diagram illustrating an example optical fiber transmission system 700 including S-DCMs. The optical fiber transmission system 700 of FIG. 7 may share similar elements with the system 100 in FIG. 1.

The system 700 may include two nodes represented by the CPUs 710, 750 or points of a fiber transmission system. The system 700 may include lengths of dispersion-compensating fiber DCF 744, 784 for transmitting light signals along the two signal paths or directions. The DCF 744 may include a run of optical fiber coupled to one or more dispersion-compensating modules. The system 700 may include amplifiers 740, 742 to offset signal losses for DCF 744, and may include amplifiers 782, 780 to offset signal losses for DCF 784. Signal losses may arise due to the DCM or other factors such as signal attenuation from the long runs of optical fiber.

A first node in the system 700 may include a processor CPU 710 coupled to a transceiver 712 for transmitting and receiving optical signals. The CPU 710 may be coupled to S-DCMs 713, 727; the S-DCM 713 may be implemented as any of the modules 400, 420, 450, or any other suitable module providing multiple options for dispersion compensation. CPU 710 may include memory and storage or the memory and storage may be discrete components (not shown). The CPU 710 may be coupled to and control the tunable dispersion compensating module TDCM 730. TDCM 730 may be used to compensate for dispersion (e.g., residual dispersion) not accounted for by the dispersion-compensating fiber 744, 784. The CPU 710's control of the TDCM 730 may be based on static control or a feedback mechanism using signals from the transceiver 712. Transceiver 712 may be coupled to optical add-drop multiplexers (OADM) 720, 722. An OADM may be referred to as an optical add-drop filter (OADF). The OADMs 720, 722 may multiplex and route channels of light into or out of the optical fibers. In the example of FIG. 7 the signal from TDCM 730 may be multiplexed to the transceiver 712 and to the run of fiber 745. For example, the CPU 710 may determine a bit error rate (BER) of the signals through DCF 744 based on signals from the transceiver 712. Based on the BER, the CPU 710 may control the TDCM 730 to correct for the BER. For example, if the CPU 710 determines one or more BERs meet or exceed a threshold based on signals from the transceiver the CPU 710 may determine or calculate a dispersion value for offset. The CPU 710 may send a signal including the dispersion value to the TDC 730.

S-DCM 727 may be configured to provide versatile dispersion compensation on the transmission line 784. S-DCM 727 may be controlled by the CPU 710 to switch between one of the available inner DCMs based on the state of the system. For example, the CPU 710 may control the S-DCM 727 based on the BER determination as described above; when the CPU detects one or more of the BERs meeting or exceed a threshold, the CPU may control the S-DCM 727 to switch between inner DCMs based on the detected BERs. In some embodiments, the S-DCM 727 may be S-DCM 420 of FIG. 4B including a pass-through segment and a compensated path. When the CPU 710 determines a residual dispersion (e.g., based on BER readings at the S-DCM 713) below an acceptable threshold, the CPU 710 may control the S-DCM 727 to select the pass-through option. When the CPU 710 determines a residual dispersion (e.g., based on BER readings at the S-DCM 713) at or above an acceptable threshold, the CPU 710 may control the S-DCM 727 to select dispersion compensation. In some embodiments, the S-DCM 727 may be implemented using other embodiments of the S-DCMs, e.g., S-DCMs 450, 470 providing for versatile and configurable dispersion compensation. In such cases, dispersion compensation and selection of the inner DCMs of the S-DCM may be based on multiple threshold levels of residual dispersion.

A second node in the system 700 may include processor CPU 750 coupled to transceiver 752. Similar elements in the second node may correspond to similar elements in the first node and may share similar functions.

The second node in the system 700 may include a processor CPU 750 coupled to a transceiver 752 for transmitting and receiving optical signals. The CPU 750 may be coupled to S-DCMs 753, 767; the S-DCM 753 may be implemented as any of the modules 400, 420, 450, or any other suitable module providing multiple options for dispersion compensation. CPU 750 may include memory and storage or the memory and storage may be discrete components (not shown). The CPU 750 may be coupled to and control the TDCM 770. TDCM 770 may be used to compensate for dispersion (e.g., residual dispersion) not accounted for by the dispersion-compensating fiber 744, 784. The CPU 750's control of the TDCM 770 may be based on static control or a feedback mechanism using signals from the transceiver 752. Transceiver 752 may be coupled to optical add-drop multiplexers (OADM) 760, 772. The OADMs 760, 772 may multiplex and route channels of light into or out of the optical fibers. In the example of FIG. 7 the signal from TDCM 770 may be multiplexed to the transceiver 752 and to the run of fiber 785. For example, the CPU 750 may determine a bit error rate (BER) of the signals through DCF 784 based on signals from the transceiver 752. Based on the BER, the CPU 750 may control the TDCM 770 to correct for the BER. For example, if the CPU 750 determines one or more BERs meet or exceed a threshold based on signals from the transceiver the CPU 750 may determine or calculate a dispersion value for offset. The CPU 750 may send a signal including the dispersion value to the TDC 770.

Figure 8:
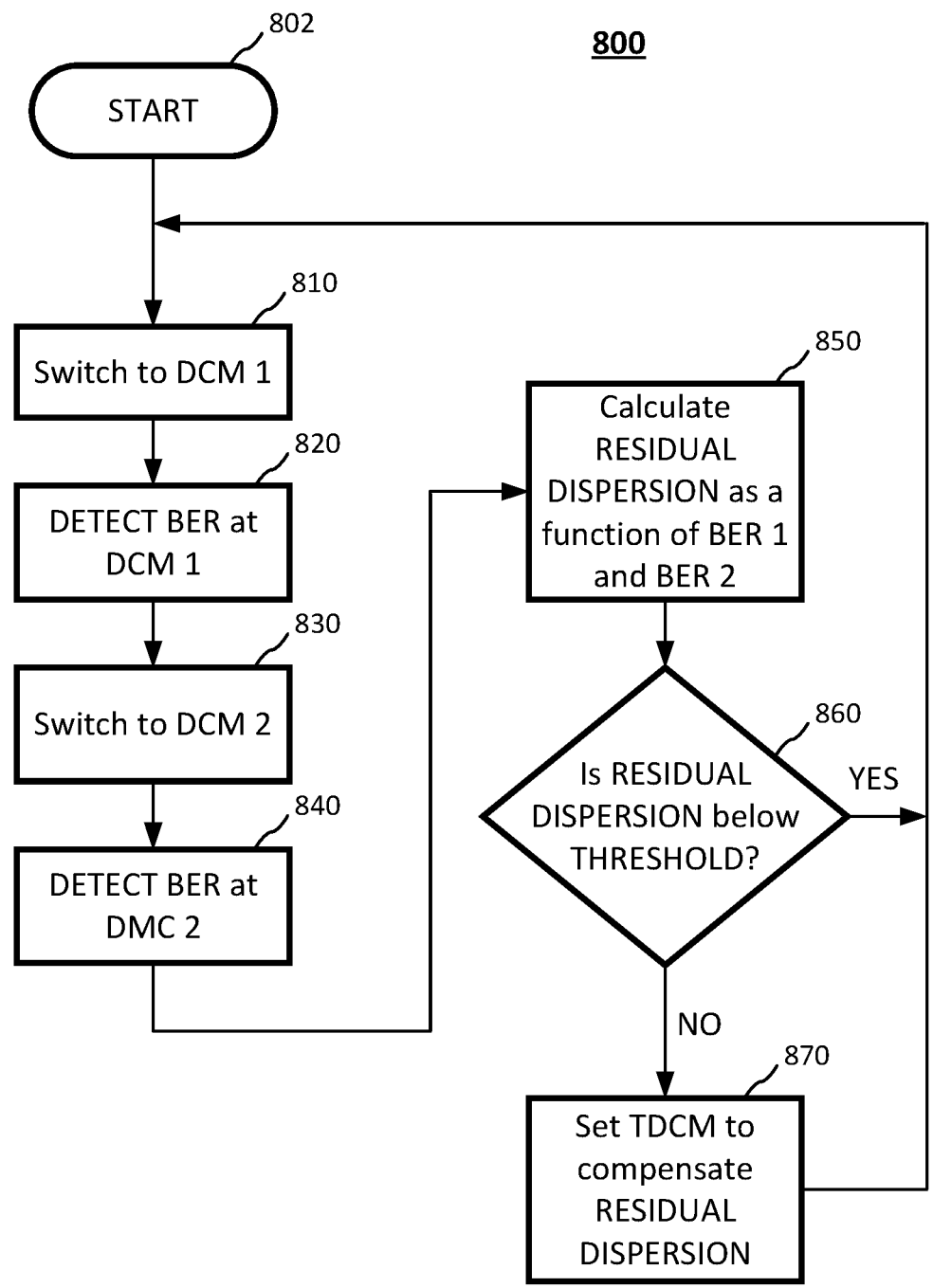
FIG. 8 is a flow chart illustrating an exemplary method for using a switch controlling dispersion compensating modules, in accordance with one or more aspects of the disclosure.

S-DCM 767 may be configured to provide versatile dispersion compensation on the transmission line 744 similar to the description provided above with respect to S-DCM 727. For example, S-DCM 767 may be controlled by CPU 750 to provide versatile and configurable dispersion compensation for transmission line 744. FIG. 8 is a flow chart illustrating an exemplary method for using an S-DCM in a fiber transmission system, in accordance with one or more aspects of the disclosure. For example, the method 800 may illustrate a feedback loop mechanism using S-DCM 470 of FIG. 4 and DCM modules to determine a residual compensating value. The S-DCM may include two internal DCMs. Method 800 may be a feedback loop mechanism used by CPU 510 of FIG. 5 or CPUs 710, 750 of FIG. 7.

The method may begin at step 802 "START". At step 810, the method may switch to DCM 1. Once the method has switched to DCM 1, at step 820 the method may detect the bit error rate (BER) at DCM 1. For example, referring to FIG. 7, CPU 710 may read the BER of one of the inner DCMs at S-DCM 713.

The method may store the BER in memory. At step 830 the method may switch to DCM 2. Once the method has switched to DCM 2, at step 840, the method may detect another BER (e.g., read another of the internal DCMs of an S-DCM). For example, referring to FIG. 7, CPU 710 may read another BER, e.g., the second inner DCM of S-DCM 713. Steps may be described as toggling between the two DCM modules to read the BER at the respective DCM module. By reading DCM 1 and DCM 2, the method at step 850 may calculate a function dependent on both BERs. For example, the formula may include a logarithmic function (e.g., Equation 1) of the BERs. At step 860 the method determines whether the residual dispersion is below a threshold. For example, the threshold may be a residual dispersion based on, e.g., standards requirements.

At step 860, if the method determines that the residual dispersion is not below the threshold, i.e., dispersion is above the threshold, ("NO" option from step 860) the method may proceed to step 870 to control a TDCM to compensate for the residual dispersion. The method may proceed back to step 810 to repeat the loop.

At step 860, if the method determines that the residual dispersion is below the threshold ("YES" option from step 860) the method may proceed back to step 810 to repeat the loop.

In another embodiment, the method may complete after one loop (e.g., ends after step 870 or "YES" option of step 860). While one iteration may be sufficient to adjust, in some embodiments as illustrated in FIG. 8, the method may continue back to 810 to run in a continuously loop. In other embodiments, the method may be run based on a timer or at other user specific time or interval.

Figure 9:
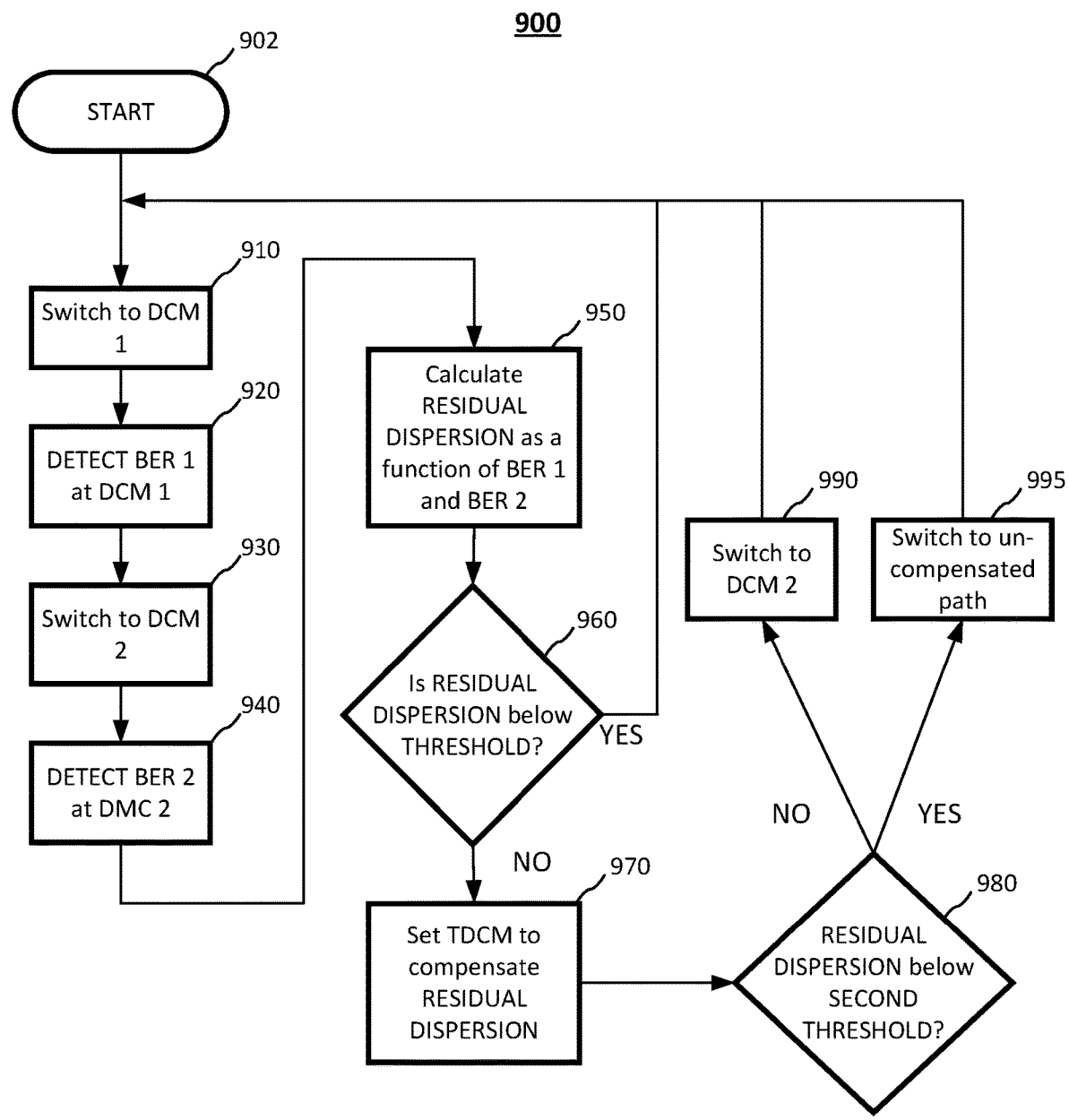
FIG. 9 is a flow chart illustrating another exemplary method for using a switch controlling dispersion compensating modules, in accordance with one or more aspects of the disclosure.

FIG. 9 is a flow chart illustrating another exemplary method for using switchable DCMs, in accordance with one or more aspects of the disclosure. For example, the method 900 may illustrate a feedback loop mechanism using the switchable DCM (e.g., S-DCM 470) and DCMs to determine a residual compensating value, by controlling a S-DCM such as S-DCM 470 of FIG. 4. Method 900 may be a feedback loop mechanism used by CPUs 710, 750 of FIG. 7.

The method may begin at step 902 "START". At step 910, the method may switch to DCM 1. Once the method has switched to DCM 1, at step 920 the method may detect the bit error rate (BER) at DCM 1. For example, referring to FIG. 7, CPU 710 may read the BER at one of inner DCMs at S-DCM 713.

The method may store the BER in memory. At step 930 the method may switch to DCM 2. Once the method has switched to DCM 2, at step 940, the method may detect another BER (e.g., read another of the internal DCMs of an S-DCM). For example, referring to FIG. 7, CPU 710 may read another BER, e.g., the second inner DCM of S-DCM 713. Steps may be described as toggling between the two DCM modules to read the BER at the respective DCM. By reading DCM 1 and DCM 2, the method may calculate a function dependent on both BERs. At step 950 the method may calculate a residual dispersion as a function of BER 1 and BER 2. For example, the formula may include a logarithmic function (e.g., Equation 1) of the BERs.

At step 960, the method may determine whether the dispersion is below a threshold. The threshold may be a minimal dispersion value need to switch between paths in an S-DCM that provides dispersion compensation. If the method determines that the residual dispersion is not below the threshold, i.e., dispersion is above the threshold, ("NO" option from step 960) the method may proceed to step 970 to control a TDCM to compensate for the residual dispersion.

At step 960, if the method determines that the residual dispersion is below the threshold ("YES" option from step 960) the method may proceed back to step 910 to repeat the loop.

At step 970 the method may set the TDCM to compensate for residual dispersion based on the value calculated in step 950.

At step 980, the method may determine whether residual dispersion is below a second threshold. In some embodiments the second threshold may be substantially similar or the same as the first threshold. In other embodiments, the second threshold may be different based on design of the transmission system. If the method determines the value is not below the second threshold ("NO" option), the method may proceed to step 990 to switch the S-DCM to DCM 2. For example, referring to FIG. 7, the S-DCM of step 990 may refer to S-DCM 727 that provides for dispersion compensation on the line 784. For example, if the method determines the residual dispersion is at or above a dispersion threshold, then the CPU 710 may control the S-DCM 727 to select an appropriate compensated path. The method may proceed back to step 910 to run in a continuous loop.

At step 980, if the method determines the value is below the second threshold ("YES" option), the method may proceed to step 995 to switch the S-DCM to an uncompensated path. For example, referring to FIG. 7, the S-DCM of step 995 may refer to S-DCM 727 that provides for dispersion compensation on the line 784. For example, if the method determines the residual dispersion is below a dispersion threshold, then the CPU 710 may control the S-DCM 727 to select an uncompensated path. The method then proceeds to step 910 to run in a continuous loop.

In another embodiment, the method may complete after one loop (e.g., ends after either of steps 990, 995). While one iteration may be sufficient to adjust, in some embodiments, the method may continue to 910 to run continuously in a loop. In other embodiments, the method may be run based on a timer or at other user specific time or interval.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. An optical fiber transmission system, the system comprising:
    an optical transmission path defined by at least:
        a span of transmission fiber for transmitting light signals through the optical fiber transmission system, and
        a tunable dispersion compensating module coupled to the span of transmission fiber; and
    a feedback loop and coupled to, but out-of-line with, the optical transmission path including:
        a switchable module, coupled to the primary optical transmission path via an optical add/drop filter, and comprising a plurality of selectable light signal paths, the plurality of selectable light signal paths comprising at least one path through a dispersion compensating element, and
        a processor coupled to the switchable module for selectively monitoring the plurality of selectable light signal paths, the processor being configured to:
            control the switchable module to switch between the plurality of selectable light signal paths to calculate an error metric for each of the plurality of selectable light signal paths, and
            derive a dispersion correction based on the error metric for each of the plurality of selectable light paths, and
            control the tunable dispersion compensating module based on the dispersion correction.

2. The optical fiber transmission system of claim 1, the optical transmission path further comprising:
    an amplifier coupled to the span of transmission fiber, the amplifier configured for offsetting losses of the light signals;
    the optical add-drop filter; and
    the feedback loop further comprising: a transceiver coupled to the switchable module and to the processor, wherein the transceiver is configured to decode the light signals received from the switchable module.

3. The optical fiber transmission system of claim 2, further comprising:
    a second span of transmission fiber for transmitting other light signals through the optical fiber transmission system;
    a second amplifier coupled to the second span of transmission fiber, the second amplifier configured for offsetting losses of the other light signals through the second span of transmission fiber; and
    a second OADF configured to multiplex light signals from the transceiver to the second span of transmission fiber.

4. The optical fiber transmission system of claim 3, wherein the plurality of selectable light signal paths comprises at least one path through a pass-through optical fiber segment, a negative-slope compensating module, or a positive-slope compensating module.

5. The optical fiber transmission system of claim 3, wherein either the span of transmission fiber or the second span of transmission fiber comprises dispersion compensating fiber.

6. The optical fiber transmission system of claim 1, wherein deriving the dispersion correction further comprises calculating the dispersion correction based on logarithmic functions of each error metric.

7. The optical fiber transmission system of claim 3, further comprising a second switchable module comprising a plurality of second selectable light signal paths, wherein the second switchable module is coupled in-line with the second span of optical fiber; and
    wherein the processor is further coupled to the second switchable module.

8. The optical fiber transmission system of claim 7, wherein the plurality of second selectable light signal paths of the second switchable module comprises at least one path through a dispersion compensating element or at least one path through a pass-through optical fiber segment.

9. The optical fiber transmission system of claim 7, wherein the processor is further configured to select one of the plurality of second selectable light signal paths based on a second dispersion correction derived from light signals received from the switchable module, and wherein the selected one of the plurality of second selectable light signal paths is selected to offset residual dispersion through the second span of transmission fiber.

10. The optical fiber transmission system of claim 1, wherein the light signals of the transmission system are modulated based on pulse amplitude modulation with four amplitude levels (PAM-4) at 50 gigabits per second (Gbps) or greater.

* * * * *